United States Patent
Sebe et al.

(10) Patent No.: US 8,442,327 B2
(45) Date of Patent: May 14, 2013

(54) APPLICATION OF CLASSIFIERS TO SUB-SAMPLED INTEGRAL IMAGES FOR DETECTING FACES IN IMAGES

(75) Inventors: Ismail Oner Sebe, Sunnyvale, CA (US); Elif Albuz, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 1083 days.

(21) Appl. No.: 12/275,565

(22) Filed: Nov. 21, 2008

(65) Prior Publication Data
US 2010/0128993 A1     May 27, 2010

(51) Int. Cl.
| | |
|---|---|
| G06K 9/00 | (2006.01) |
| G06K 9/34 | (2006.01) |
| G06K 9/20 | (2006.01) |
| G06K 9/36 | (2006.01) |
| G06K 9/62 | (2006.01) |
| H04N 7/18 | (2006.01) |

(52) U.S. Cl.
USPC ........... 382/224; 382/118; 382/165; 382/173; 382/181; 382/282; 348/143

(58) Field of Classification Search .................. 382/100, 382/115–118, 173, 181, 224; 348/143, 152–159; 345/441
See application file for complete search history.

(56) References Cited

U.S. PATENT DOCUMENTS

| | | | |
|---|---|---|---|
| 7,016,881 B2 | 3/2006 | Li et al. | |
| 7,024,033 B2 | 4/2006 | Li et al. | |
| 7,050,607 B2 | 5/2006 | Li et al. | |
| 7,099,505 B2 | 8/2006 | Li et al. | |
| 7,190,829 B2 | 3/2007 | Zhang et al. | |
| 7,315,631 B1 | 1/2008 | Corcoran et al. | |
| 7,324,671 B2 | 1/2008 | Li et al. | |
| 7,379,568 B2 | 5/2008 | Movellan et al. | |
| 7,403,643 B2 | 7/2008 | Ianculescu et al. | |
| 7,460,694 B2 | 12/2008 | Corcoran et al. | |
| 7,460,695 B2 | 12/2008 | Steinberg et al. | |
| 7,469,055 B2 | 12/2008 | Corcoran et al. | |
| 7,508,961 B2 | 3/2009 | Chen et al. | |
| 7,587,069 B2 | 9/2009 | Movellan et al. | |
| 7,590,267 B2 | 9/2009 | Xiao et al. | |

(Continued)

OTHER PUBLICATIONS

H. Bay, T. Tuytelaars, and L. V. Gool, "SURF: Speeded up robust features," in Proc. of the 9th European Conference on Computer Vision (ECCV'06) vol. 3951. Graz, Austria: Springer-Verlag, May 2006, pp. 404-417.*

(Continued)

*Primary Examiner* — Randolph I Chu
*Assistant Examiner* — Nathan Bloom

(57) ABSTRACT

A method for more efficiently detecting faces in images is disclosed. The integral image of an image may be calculated. The integral image may be sub-sampled to generate one or more sub-sampled integral images. A plurality of classifiers may be applied in one or more stages to regions of each sub-sampled integral image, where the application of the classifiers may produce classification data. The classification data may be used to determine if a face is associated with any of the regions of each sub-sampled integral image. The face determination results may be used to modify the original image such that, when rendered, the image is displayed with a graphical object identifying the face in the image. Accordingly, face detection processing efficiency may be increased by reducing the number of integral image calculations and processing localized data through application of classifiers to sub-sampled integral images.

23 Claims, 8 Drawing Sheets

U.S. PATENT DOCUMENTS

| | | | |
|---|---|---|---|
| 7,620,218 | B2 | 11/2009 | Steinberg et al. |
| 7,624,076 | B2 | 11/2009 | Movellan et al. |
| 7,689,033 | B2 | 3/2010 | Xiao et al. |
| 7,720,284 | B2 | 5/2010 | Zhang et al. |
| 7,773,781 | B2 | 8/2010 | Kim |
| 7,864,990 | B2 | 1/2011 | Corcoran et al. |
| 7,916,897 | B2 | 3/2011 | Corcoran et al. |
| 8,050,465 | B2 | 11/2011 | Ianculescu et al. |
| 8,055,029 | B2 | 11/2011 | Petrescu et al. |
| 8,144,945 | B2 | 3/2012 | Wang et al. |
| 8,233,676 | B2 | 7/2012 | Ngan et al. |
| 8,265,399 | B2 | 9/2012 | Steinberg et al. |
| 8,270,674 | B2 | 9/2012 | Corcoran et al. |
| 8,295,610 | B1 | 10/2012 | Brunner |
| 2002/0102024 | A1* | 8/2002 | Jones et al. ............ 382/225 |
| 2007/0154095 | A1* | 7/2007 | Cao et al. ............... 382/190 |
| 2007/0237387 | A1* | 10/2007 | Avidan et al. .......... 382/159 |
| 2008/0037827 | A1* | 2/2008 | Corcoran et al. ....... 382/103 |
| 2008/0181510 | A1* | 7/2008 | Rising .................... 382/199 |
| 2008/0232698 | A1* | 9/2008 | Shi et al. ................ 382/225 |

OTHER PUBLICATIONS

B. Kisacanin, "Integral Image Optimizations for Embedded Vision Applications: Image Analysis and Interpretation," Proceedings of IEEE Southwest Symposium on Image Analysis and Interpretation, Santa Fe, Mar. 2008.*

P. Viola and M. Jones, "Rapid Object Detection Using a Boosted Cascade of Simple Features," Proc. IEEE CVPR, 2001.*

Herbert Bay, Andreas Ess, Tinne Tuytelaars, Luc Van Gool, Speeded-Up Robust Features (SURF), Computer Vision and Image Understanding, vol. 110, Issue 3, Jun. 2008, pp. 346-359.*

Szasz-toth, L. (2009). Diploma thesis Combination of Classifier Cascades and Training Sample Selection for Robust Face Detection Submitted by. (R. Alt & H. Österle, Eds.)Computer, (January), 1-16. Springer.*

Harm J. W. Belt. Word length reduction for the integral image.. ICIP, 805-808, IEEE, 2008.*

Derpanis, K. G. (2007). Integral image-based representations. Department of Computer Science and Engineering York University Paper, 1(2), 1-6. York University.*

Ren, J., Kehtarnavaz, N., & Estevez, L. (2008). Real-time optimization of Viola-Jones face detection for mobile platforms. 2008 IEEE Dallas Circuits and Systems Workshop SystemonChip Design Applications Integration and Software.*

Jung et al, Real-Time Face Verification for Mobile Platforms, 4th International Symposium ISVC 2008.*

Geismann, P.; Schneider, G.; , "A two-staged approach to vision-based pedestrian recognition using Haar and HOG features," Intelligent Vehicles Symposium, 2008 IEEE , vol., no., pp. 554-559, Jun. 4-6, 2008.*

C. Wojek, G. Dorko', A. Schulz, and B. Schiele, "Sliding-Windows for Rapid Object Class Localization: A Parallel Technique," Proc. Symp. German Assoc. for Pattern Recognition.*

* cited by examiner

APPLICATION OF CLASSIFIERS TO SUB-SAMPLED INTEGRAL IMAGES FOR DETECTING FACES IN IMAGES

BACKGROUND OF THE INVENTION

Automated face detection is a form of machine-implemented visual object detection used to locate faces in a digital image. Detecting faces in images has been used in a variety fields including biometrics, neuroscience and psychology. Additionally, face detection is currently being used in many consumer applications such as video surveillance systems, digital cameras for use with auto-focusing operations, tagging pictures on social networking websites, etc.

A first conventional face detection algorithm applies classifiers to various portions of an image until a face is detected. The size of the classifier is varied and applied to the image again to detect faces in the image of different sizes. This conventional solution requires many operations, and consequently, is not speed optimized when run on a graphics processing unit (GPU). Additionally, this conventional solution decreases the localization of processed data as the classifier scale or size is increased, thereby decreasing efficiency when processed using a GPU which can more efficiently process localized data.

A second conventional face detection algorithm involves downscaling the image to create multiple images which are smaller in size than the original image. An integral image for each of the downscaled images is then created, where classifiers are then applied to each of the integral images. Although this conventional solution is more efficient than the first conventional solution, it remains relatively inefficient since integral image calculations are computationally-intensive and this conventional solution requires a separate integral image calculation for each downscaled image.

A third conventional face detection algorithm involves calculating the integral image of an image. Classifiers of different scales are then applied to the integral image to detect faces in the image. Although this conventional solution is more efficient than the above-described first and second conventional solutions, it remains relatively inefficient since the localization of the processed data decreases as the classifier scale or size is increased, thereby decreasing efficiency when processed using a GPU which can more efficiently process localized data.

SUMMARY OF THE INVENTION

Accordingly, a need exists for a computer-implemented face detection algorithm which enables more efficient face detection using a graphics processing unit (GPU). A need also exists for a face detection algorithm which reduces the number of integral image calculations used to detect faces in an image. Additionally, a need exists for a face detection algorithm which involves processing more localized data at larger classifier scales to increase GPU processing efficiency. Embodiments of the present invention provide novel solutions to these needs and others as described below.

Embodiments of the present invention are directed to a computer-implemented method for more efficiently detecting faces in images. More specifically, the integral image of an image may be calculated. The integral image may be sub-sampled to generate one or more sub-sampled integral images. A plurality of classifiers may be applied, in one or more stages, to regions of each sub-sampled integral image, where the application of the classifiers may produce classification data. The classification data may be used to determine if a face is associated with any of the regions of each sub-sampled integral image. For example, a portion of the classification data associated with a specific region may be compared to a predetermined threshold to determine if that region is associated with a face. Thereafter, the face determination results may be used to modify the original image such that, when rendered, the image is displayed with a box, a circle, a polygon, brackets, or another graphical object identifying the face in the image.

Accordingly, embodiments improve face detection processing efficiency when implemented using a GPU by reducing the number of integral images calculations to one. Additionally, by applying the classifiers to sub-sampled images (e.g., in contrast to scaling the classifiers), embodiments enable increased localized data processing for an increased number of scales. In one embodiment, localized data may be processed for all sub-sampled images, and therefore, for all scales. In this manner, embodiments increase the efficiency of face detection using a GPU which is an effective processor for localized data.

In one embodiment, a computer-implemented method of automatically detecting a face in an image includes generating an integral image based upon the image and sub-sampling the integral image to generate a sub-sampled integral image, wherein the sub-sampled integral image includes a plurality of regions. A plurality of classifiers is applied to a region of the plurality of regions of the sub-sampled integral image to generate classification data. Additionally, it is determined whether the region is associated with a face in the image based upon the classification data. The method may also include generating a second image from the image based upon results of determining that the region is associated with the face. The method may further include applying a first plurality of classifiers in a first stage to the region of the sub-sampled integral image to generate first classification data, and if the region is determined to be associated with the face based upon the first classification data, applying a second plurality of classifiers in a second stage to the region of the sub-sampled integral image to generate second classification data. The method may be advantageously implemented using one or more GPUs.

In another embodiment, a computer-usable medium may have computer-readable program code embodied therein for causing a computer system to perform the method of detecting a face in an image as discussed above. And in yet another embodiment, a computer system may include a processor and a memory, wherein the memory includes instructions that when executed by the processor perform the method of detecting a face in an image as discussed above, where the processor may be a GPU, central processing unit (CPU), or some combination thereof.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
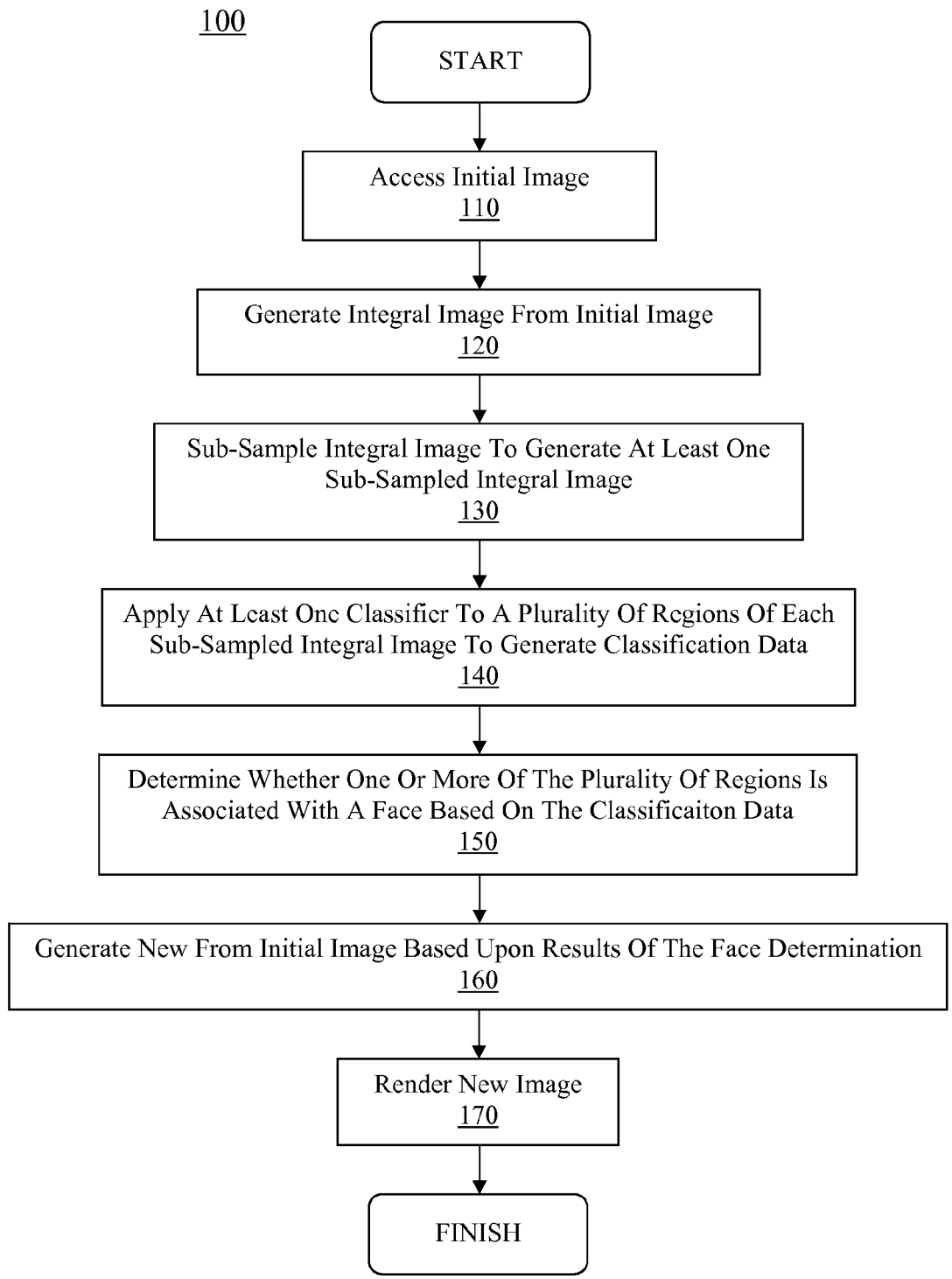
FIG. 1 shows a flowchart of an exemplary computer-implemented process for detecting a face in an image in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "configuring," "creating," "debugging," "defining," "delivering," "depicting," "detecting," "determining," "displaying," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "querying," "removing," "rendering," "repeating," "resuming," "sampling," "simulating," "sorting," "storing," "sub-sampling," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

Embodiments are directed to a machine-implemented method for more efficiently detecting faces in images. More specifically, the integral image of an image is calculated. The integral image may be sub-sampled to generate one or more sub-sampled integral images. A plurality of classifiers may be applied to regions of each sub-sampled integral image, where the application of the classifiers may produce classification data. The classification data is used to determine if a face is associated with any of the regions of each sub-sampled integral image. For example, a portion of the classification data associated with a specific region may be compared to a predetermined threshold to determine if that region is associated with a face.

The classifiers may be applied to one or more sub-sampled images in stages. Each stage may involve the application of a different number and/or type of classifier to the one or more sub-sampled integral images. Subsequent stages may be performed if the classification data indicates that a face is associated with the one or more sub-sampled integral images. Additionally, in one embodiment, if the classification data for all stages indicates that a face is associated with the one or more sub-sampled integral images, then it may be determined that one or more faces are associated with respective regions of each of the sub-sampled integral images.

The face determination results for each of the sub-sampled integral images may be combined and applied to the original image. For example, regions of the respective sub-sampled integral images associated with a face may be mapped to regions of the original image, thereby indicating which regions of the original image are associated with a face. Thereafter, these results may be used to modify the original image such that, when rendered, the image is displayed with a visual attribute, e.g., a box, a circle, a polygon, brackets, or another graphical object identifying at least one face in the image.

Accordingly, embodiments improve face detection processing efficiency on a GPU by reducing the number of integral images calculations to one. Additionally, by applying the classifiers to sub-sampled images (e.g., in contrast to scaling the classifiers), embodiments advantageously employ more localized data processing for an increased number of scales. In one embodiment, localized data may be processed for all sub-sampled images, and therefore, for all scales. In this manner, embodiments increase the efficiency of face detection using a GPU which is an effective processor for localized data.

Figure 2:
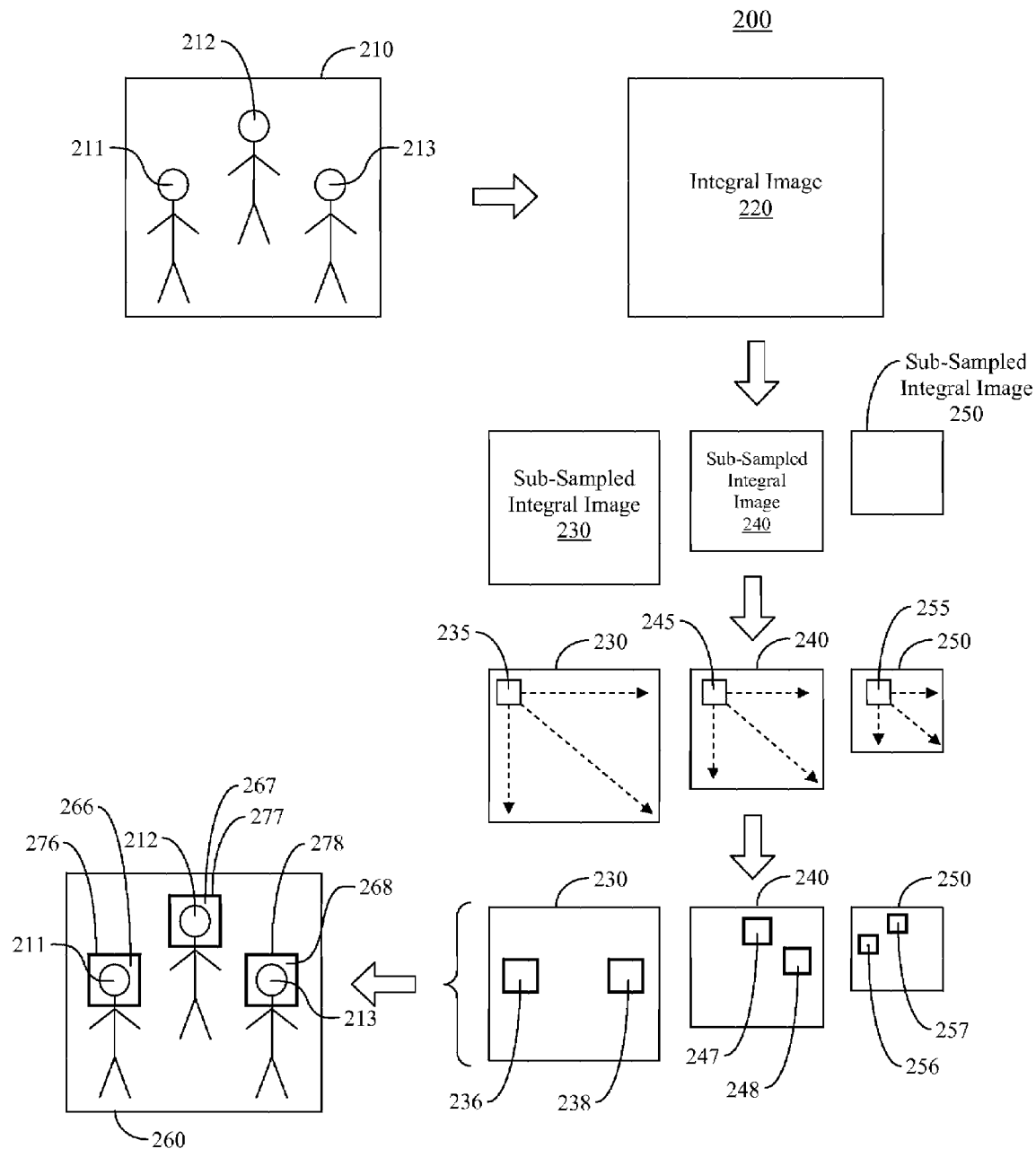
FIG. 2 shows an exemplary diagram for automatically detecting a face in an image in accordance with one embodiment of the present invention.

FIG. 1 shows a flowchart of exemplary computer-implemented process 100 for detecting a face in an image in accordance with one embodiment of the present invention. FIG. 1 will be described in conjunction with FIG. 2, where FIG. 2 shows exemplary diagram 200 for automatically detecting a face in an image in accordance with one embodiment of the present invention.

As shown in FIG. 1, step 110 involves accessing an initial image (e.g., 210). The image may include a still image, a frame from a video, or the like. Additionally, the image may include data for a plurality of pixels, where the data may include color information for each pixel, depth information for each pixel, or the like. Further, the image (e.g., 210) may include at least one face (e.g., 211, 212, 213, etc.).

Step 120 involves generating an integral image (e.g., 220) from the initial image (e.g., 210). The integral image may be generated using an integral image calculation in one embodiment. Additionally, in one embodiment, the integral image of the initial image may be calculated in accordance with the methodology of Paul Viola and Michael Jones discussed in the paper "Robust Real-Time Object Detection" (2001), which is incorporated herein by reference in its entirety.

As shown in FIG. 1, step 130 involves sub-sampling the integral image (e.g., 220) to generate at least one sub-sampled integral image (e.g., 230, 240, 250, etc.). In one embodiment, each of the sub-sampled integral images (e.g., 230-250) may be integer scales of the integral image (e.g., 220). For example, sub-sampled integral image 230 may be half the size of integral image 220, sub-sampled integral image 240 may be one-third the size of integral image 220, sub-sampled integral image 250 may be one-fifth the size of integral image 220, etc.

Additionally, one or more of the sub-sampled integral images (e.g., 230, 240, 250, etc.) may include portions of data from the integral image (e.g., 220). For example, where sub-sampled integral image 230 is half the size of integral image 220, every other column and/or row of integral image 220 may be removed to create sub-sampled integral image 230. As another example, another sub-sampled integral image may be generated in step 130 by removing other portions of integral image 220 (e.g., every third column/row, every fourth column/row, random columns, random rows, random pixels, etc.).

As shown in FIG. 1, step 140 involves applying at least one classifier (e.g., 235, 245, 255, etc.) to a plurality of regions of each sub-sampled integral image (e.g., 230, 240, 250, etc.) to generate classification data. The classification data generated in step 140 may be any data which may be used to determine if a given region of a sub-sampled integral image is associated with a face (e.g., 211-213) in the original image (e.g., 210). The classification data for each region and/or each classifier may be generated based upon an access or read of one or more portions of the image data associated with region, where the portions of the region to be read may be specified by or otherwise associated with the classifier. For example, a classifier applied to a region may specify that portions of data from the region associated with the corners of the classifier are read and used to determine the classification data for that region and classifier. Alternatively, a classifier applied to the region may specify or be associated with accessing another portion of the region (e.g., a row, a column, a plurality of pixels forming a shape, etc.) used to generate the classification data for the region.

In one embodiment, the regions to which the one or more classifiers are applied may be offset by one pixel in either the horizontal direction and/or the vertical direction, thereby causing the regions to overlap where the classifiers are larger than one pixel. As such, where a different thread is assigned to the application of a classifier to each region, embodiments may increase processing efficiency on a GPU since each thread may process localized data (e.g., during the application of a classifier to a region). As a more specific example, the data associated with a first region is in proximity to and/or includes a portion of the data associated with a second region which overlaps and is offset by one pixel from the first region, and therefore, a first and second thread may process localized data where the first thread is assigned to the first region and the second thread is assigned to the second region.

In step 140, different types of classifiers may be applied to a sub-sampled integral image. For example, classifiers of different sizes (e.g., 5 pixels by 5 pixels, 10 pixels by 10 pixels, another size, etc.) may be applied. Classifiers of different shapes (e.g., squares, rectangles, diamonds, triangles, another polygon, another shape, etc.) may be applied.

The classifiers applied in step 140 may be associated with at least one different predetermined threshold in one embodiment. For example, a first classifier applied to a region may be associated with a first predetermined threshold, while a second classifier applied to the region (or another region of that sub-sampled integral image, a region of another sub-sampled integral image, etc.) may be associated with a second predetermined threshold. The predetermined thresholds may be used for comparison with the respective classification data (e.g., generated as a result of applying the respective classifier to the region) to determine if the region is associated with a face.

In one embodiment, the classifiers may be applied to each region of a sub-sampled integral image (e.g., 230, 240, 250, etc.) in stages, where each stage may involve the application of a different number of classifiers (e.g., the number of classifiers applied may be increased with each subsequent stage performed), different types of classifiers (e.g., with different shapes, sizes, etc.), classifiers associated with different thresholds, etc. In one embodiment, the classifiers may be applied in stages in step 140 in accordance with process 700 of FIG. 7.

In one embodiment, steps 120 through 140 of process 100 may be performed in accordance with the exemplary code show in Table 1 below.

TABLE 1

IntegralImage = Integral( Image );
For all scales S
   IntegralImage$_S$ = Subsample( IntegralImage );
   For all pixel p$_{ij}$ in IntegralImage$_S$
      Apply Classifiers to pixel p$_{ij}$ As shown in FIG. 1, step 150 involves determining whether one or more of the plurality of regions is associated with a face based on the classification data (e.g., generated in step 140). The classification data may be analyzed in step 150 to determine which respective regions of each sub-sampled integral image, if any, are associated with a face. In one embodiment, the portions of the classification data may be compared with a predetermined threshold (e.g., associated with the classifier applied to a region, associated with the region itself, etc.) to determine if the region is associated with a face (e.g., 211, 212, 213, etc.). For example, analysis of the classification data in step 150 may indicate that region 236 (e.g., of sub-sampled integral image 230) is associated with a first face (e.g., 211 of initial image 210), region 238 (e.g., of sub-sampled integral image 230) is associated with a third face (e.g., 213 of initial image 210), region 247 (e.g., of sub-sampled integral image 240) is associated with a second face (e.g., 212 of initial image 210), region 248 (e.g., of sub-sampled integral image 240) is associated with a third face (e.g., 213 of initial image 210), region 256 (e.g., of sub-sampled integral image 250) is associated with a first face (e.g., 211 of initial image 210), and region 257 (e.g., of sub-sampled integral image 250) is associated with a second face (e.g., 212 of initial image 210).

Step 150 may also involve combining the results of the classification data analysis and applying the results to the initial image (e.g., 210) to determine which regions of the initial image are associated with a face. For example, regions of the respective sub-sampled integral images associated with a face (e.g., regions 236, 238, 247, 248, 256 and 257) may be mapped to regions of the initial image (e.g., regions 236 and 256 mapped to region 266, regions 247 and 257 mapped to region 267, and regions 248 and 258 mapped to region 268). In this manner, it may be determined in step 150 that regions of the initial image (e.g., 266, 267 and 268) are associated with a face (e.g., 211, 212, and 213, respectively).

As shown in FIG. 1, step 160 involves generating a new image from the initial image (e.g., 210) based upon results of the face determination (e.g., performed in step 150). In one embodiment, the initial image may be modified in step 160 such that, when rendered, the image is displayed with a box, a circle, a polygon, brackets, or another graphical object identifying at least one face in the image. For example, initial image 210 may be modified by altering the graphical data of image 210 to generate new image 260 as shown in FIG. 2, where the graphical data alteration may cause new image 260 to be rendered with graphical objects 276, 277 and 278 in proximity to faces 211, 212, and 213, respectively.

Step 170 involves rendering the new image (e.g., 260). In one embodiment, the new image (e.g., 260) may be displayed on a display screen of a computer system (e.g., 800 of FIG. 8) with graphical objects (e.g., 276, 277 and 278) for indicating one or more regions of the image (e.g., 260) which are associated with a face (e.g., 211, 212, 213, etc.).

It should be appreciated that process 100 may be performed on a GPU, CPU, or some combination thereof. In one embodiment, one or more steps of process 100 may be performed using a GPU for increased efficiency. For example, one or more steps of process 100 may involve increased localized data processing, and therefore, increases in processing efficiency may be realized by using a GPU which more efficiently processes localized data.

Figure 3:
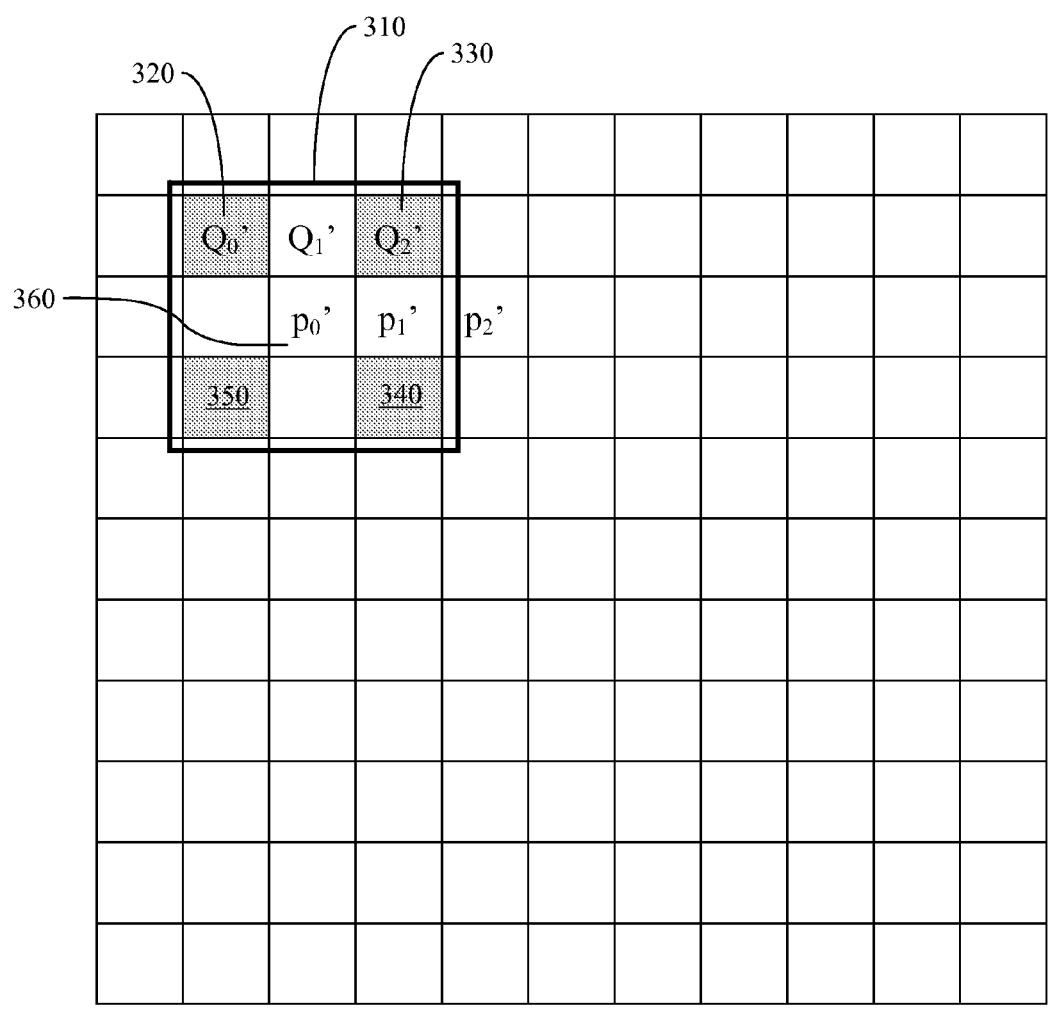
FIG. 3 shows an exemplary application of a classifier to a first region of an exemplary sub-sampled integral image in accordance with one embodiment of the present invention.
Figure 4:
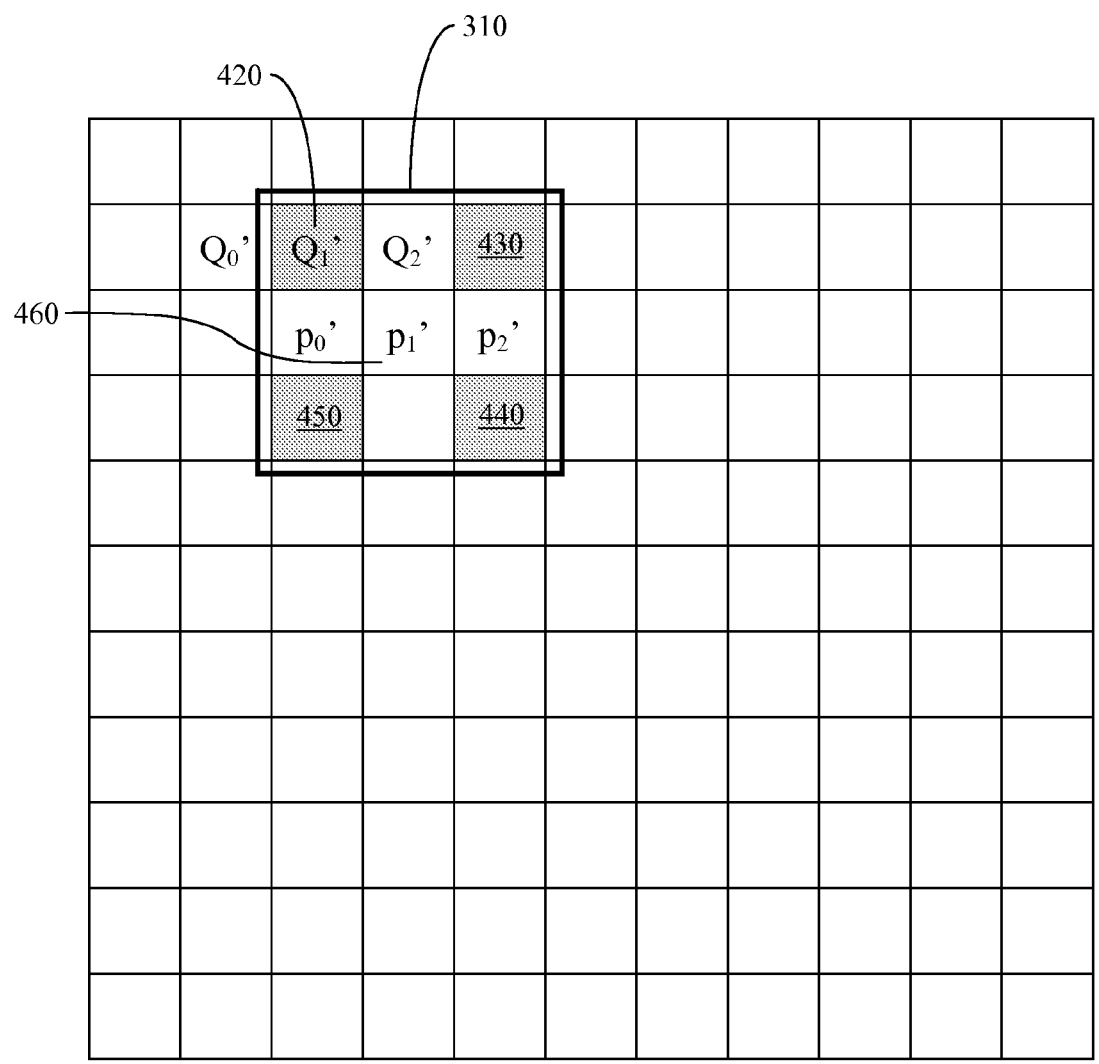
FIG. 4 shows an exemplary application of a classifier to a second region of an exemplary sub-sampled integral image in accordance with one embodiment of the present invention.
Figure 5:
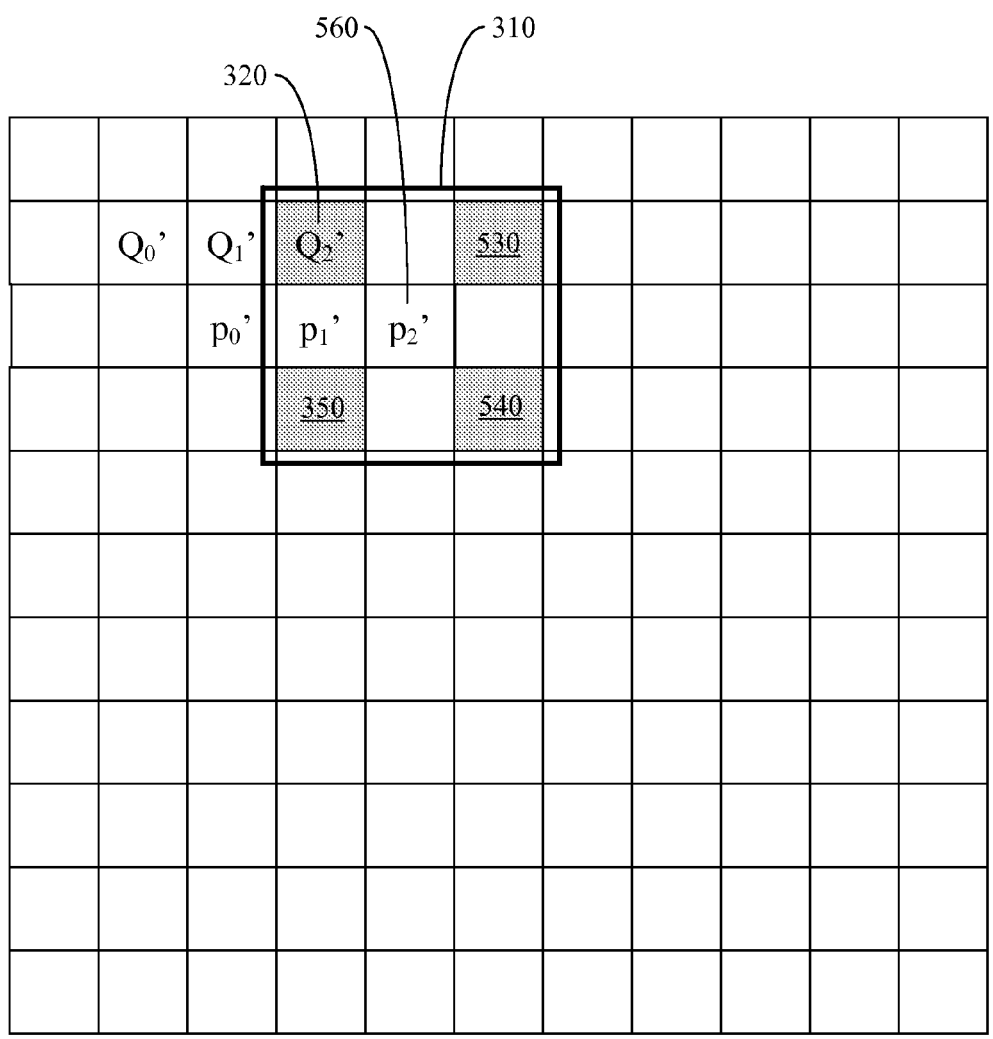
FIG. 5 shows an exemplary application of a classifier to a third region of an exemplary sub-sampled integral image in accordance with one embodiment of the present invention.

FIG. 3, FIG. 4 and FIG. 5 show an exemplary application of a classifier to different regions of exemplary sub-sampled integral image 300 in accordance with one embodiment of the present invention. Sub-sampled integral image 300 may be a sub-sampled integral image as shown in FIG. 2 (e.g., 230, 240, 250, etc.), a portion of a sub-sampled integral image as shown in FIG. 2 (e.g., 230, 240, 250, etc.), etc. As shown in FIG. 3, classifier 310 is applied to a first region such that corner pixels 320-350 may be read during application of classifier 310 to the first region. As shown in FIG. 4, classifier 310 is applied to a second region such that corner pixels 420-450 may be read during application of classifier 310 to the second region. As shown in FIG. 5, classifier 310 is applied to a third region such that corner pixels 320, 530, 540 and 350 may be read during application of classifier 310 to the third region.

As shown in FIG. 3, FIG. 4 and FIG. 5, the regions of sub-sampled integral image 300 to which classifiers are applied overlap and are offset by one pixel. Additionally, each region to which classifier 310 is applied may be associated with a separate thread (e.g., the region of FIG. 3 may be associated with a first thread, the region of FIG. 4 may be associated with a second thread, and the region of FIG. 5 may be associated with a third thread). In this manner, each of the threads (e.g., associated with the regions of FIGS. 3, 4 and 5) may process localized data (e.g., located in proximity to data processed by an adjacent thread) during the application of classifier 310 to a respective region of sub-sampled integral image 300.

In one embodiment, localized data may be processed regardless of the scale associated with the sub-sampled integral image. For example, where each sub-sampled integral image is a different size and is therefore associated with a different scale (e.g., to identify faces and/or facial features of different sizes), embodiments enable the classifiers to be applied to regions which overlap and are offset by one pixel. In this manner, localized data may be processed regardless of scale (e.g., relative size of the sub-sampled integral image and the original integral image), thereby increasing processing efficiency using a GPU and enabling detection of faces and/or facial features of different sizes.

As shown in FIG. 3, FIG. 4 and FIG. 5, the classifier (e.g., 310) and/or the region read by the classifier 310 may be centered on pixel 360 (labeled "$p_0'$"), pixel 460 (labeled "$p_1'$") and pixel 560 (labeled "$p_2'$"), respectively. The relationship between the central pixel (e.g., 360, 460 and 560) and a pixel being read (e.g., pixel 320 labeled "$Q_0'$", pixel 330 labeled "$Q_1'$" and pixel 340 labeled "$Q_2'$", respectively) may be expressed by the following equations:

$$Q_0' = p_0' + k$$

$$Q_1' = p_1' + k + 1$$

$$Q_2' = p_2' + k + 2$$

The term "k" may be a constant related to the size of the classifier (e.g., half the width and/or height of the classifier). The three equations may be used by one or more threads to locate the position of a pixel to be read for generation of classification data associated with the classifier and/or region. It should be appreciated that additional equations may be used by a thread to locate the position of other pixels to be read (e.g., three additional equations locating the other three corner pixels to be read as discussed with respect to FIGS. 3, 4 and 5).

In embodiment, each equation may be accessed and/or used (e.g., to read a value from the region for use in generating the classification data for the region) by a different thread. For example, a thread associated with the region of FIG. 3 may access and/or use the first equation, a thread associated with the region of FIG. 4 may access and/or use the second equation, and a thread associated with the region of FIG. 5 may access and/or use the third equation. Accordingly, as can be seen from the equations, the location of the pixel read is offset by one pixel. Thus, processing efficiency may be increased by processing localized data.

The first set of equations above may be derived from a second set of equations:

$$Q_0 = p_0 + k*S$$

$$Q_1 = p_1 + (k+1)*S$$

$$Q_2 = p_2 + (k+2)*S$$

The term "$Q_i$" may be a location where data is read, while the term "$p_i$" may be a center pixel where the region and/or classifier is centered. The term "k" may be a constant related to the size of the classifier (e.g., half the width and/or height of the classifier). Additionally, the term "S" may be the scale associated with a classifier.

The first set of equations may be derived from the second set of equations by sub-sampling the integral image to cause the term "S" to drop out of the equation (e.g., as shown by the absence of the term "S" in the first set of equations). In this manner, the first set of equations is not dependent upon scale (since there is not term "S" in the first set of equations), and therefore, may be applied to a sub-sampled integral image associated with any scale.

The second set of equations above may be derived from a third set of equations:

$$Q_0 = p_0 + [k*S]$$

$$Q_i = p_1 + [k*S] + [1*S]$$

$$Q_2 = p_2 + [k*S] + [2*S]$$

The term "$Q_i$" may be a location where data is read, while the term "$p_i$" may be a center pixel where the region and/or classifier is centered. The term "k" may be a constant related to the size of the classifier (e.g., half the width and/or height of the classifier). Additionally, the term "S" may be the scale associated with a classifier. Further, the brackets may indicate a flooring or rounding operation.

The second set of equations may be derived from the third set of equations by forcing the term "S" to be an integer. As such, the spacing of the points "$Q_i$" may be fixed and the rounding or flooring operations may be eliminated.

Although the offset associated with classifier 310 and/or the regions to which classifier 310 is applied has been described as having a value of one, it should be appreciated that a different offset may be used in other embodiments. Additionally, it should be appreciated that non-consistent offsets may be used in other embodiments. For example, a first and second region may have an offset of two pixels, while the second and a third region may be offset by three pixels. Accordingly, embodiments enable processing of localized data using a variety of offsets associated with application of classifiers to sub-sampled integral images.

Figure 6:
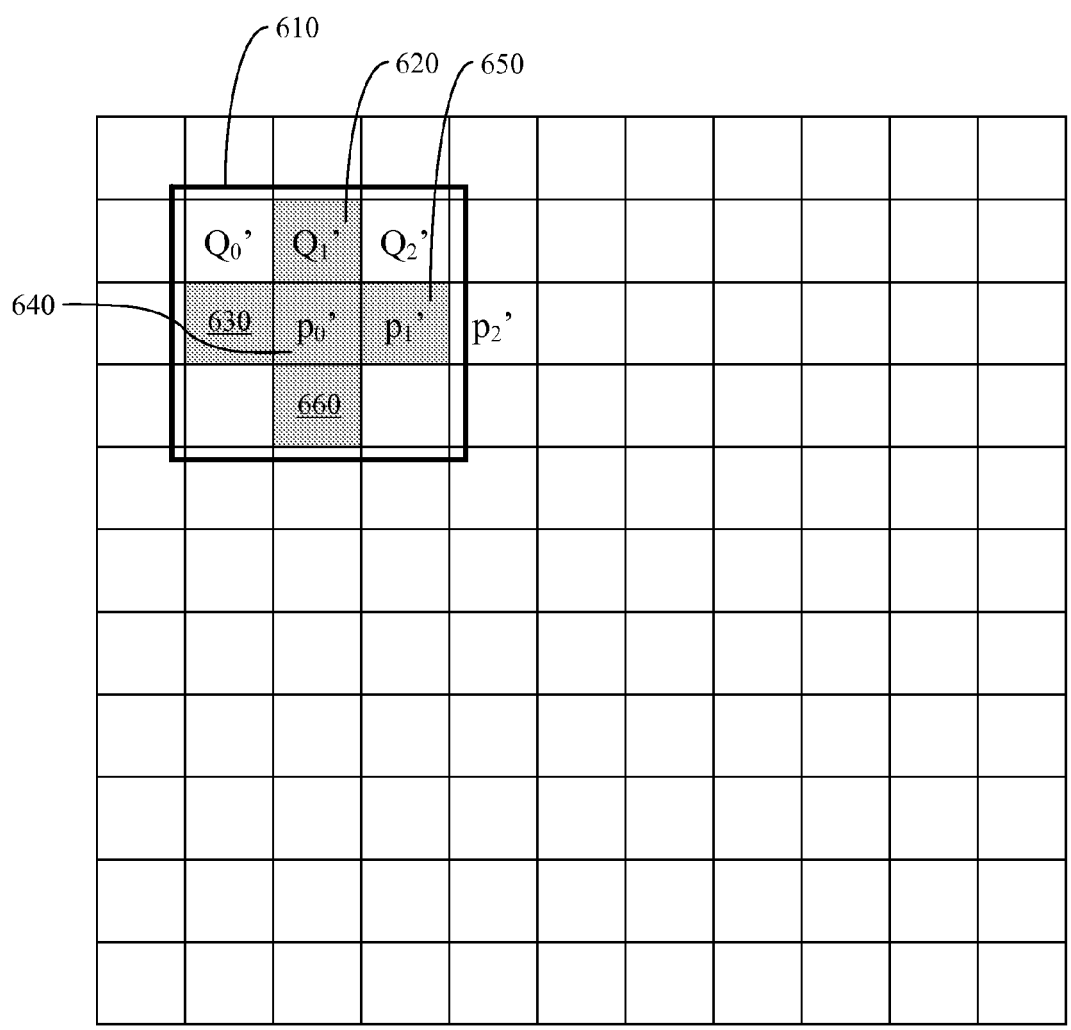
FIG. 6 shows application of an exemplary classifier with an alternate shape in accordance with one embodiment of the present invention.

Additionally, although the classifier applied in FIGS. 3, 4 and 5 is of the same size and shape, it should be appreciate that classifiers with different sizes and/or shapes (e.g., the shape of the pixels being read to generate the classification data, the shape of the entire classifier including portions which are not read, etc.) may be applied in other embodiments. For example, FIG. 6 shows application of exemplary classifier 610 with an alternate shape in accordance with one embodiment of the present invention. As shown in FIG. 6, application of classifier 610 to a region centered around pixel 640 may cause pixels 620-660 to be read and used to generate classification data for the region.

Figure 7:
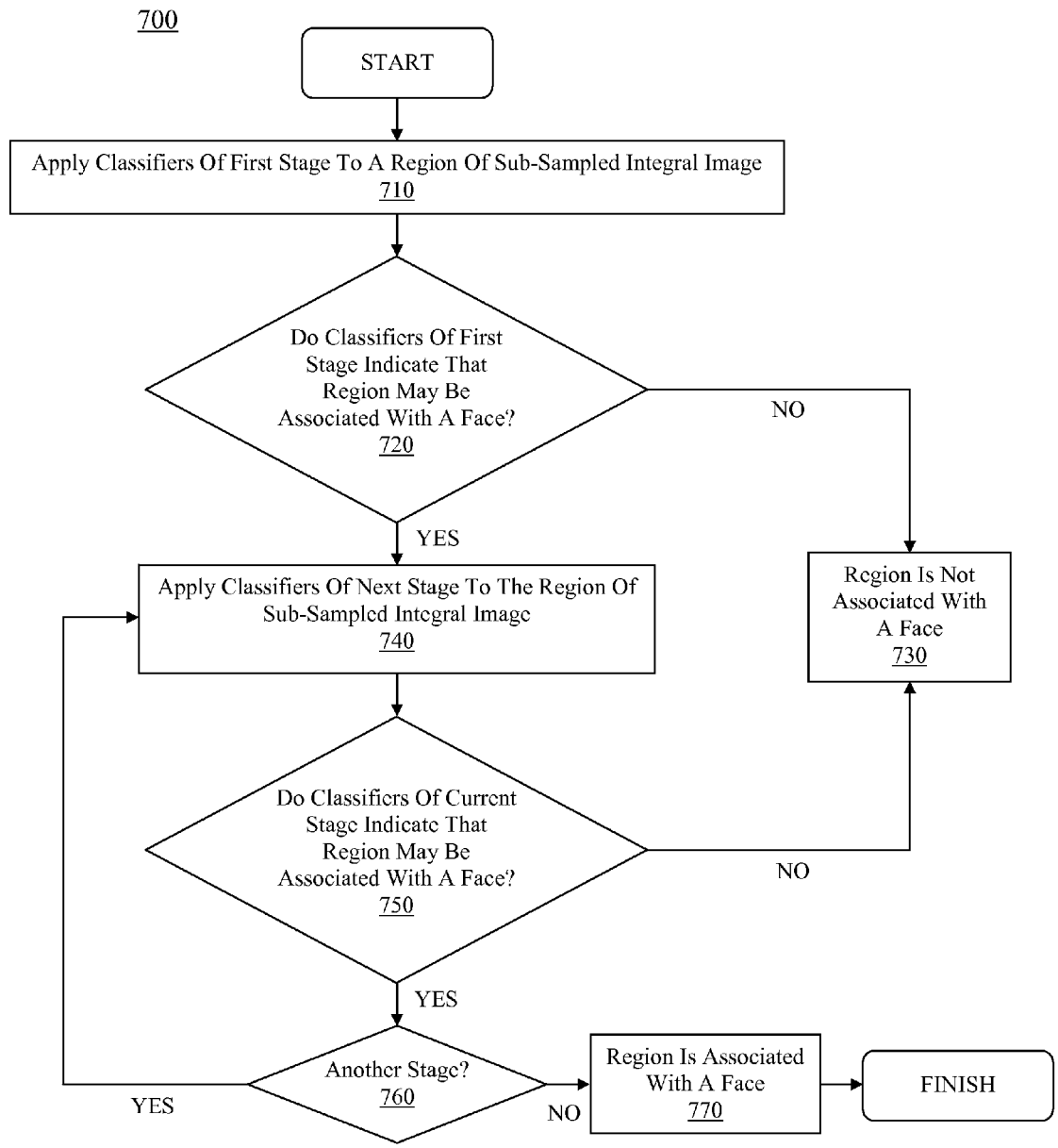
FIG. 7 shows a flowchart of an exemplary computer-implemented process for applying classifiers in stages in accordance with one embodiment of the present invention.

FIG. 7 shows a flowchart of exemplary computer-implemented process 700 for applying classifiers in stages in accordance with one embodiment of the present invention. As shown in FIG. 7, step 710 involves applying classifiers of a first stage to a region of a sub-sampled integral image (e.g. 230, 240, 250, etc.). In one embodiment, the plurality of classifiers applied to the region in step 710 may each be of a different size, shape, type, associated with a different predetermined threshold, some combination thereof, etc. Additionally, respective classification data may be generated for each of the classifiers applied to the region in step 710.

Step 720 involves determining whether classifiers of the first stage (e.g., applied in step 710) indicate that the region may be associated with a face. If it is determined that the region may not associated with a face (e.g., the classification data for all classifiers applied to the region in step 710 fails to indicate that a face may be associated with the region), then a determination may be made in step 730 that the region is not associated with a face. Alternatively, if it is determined that the region may be associated with a face (e.g., the classification data for at least one of the classifiers applied to the region in step 710 indicates that a face may be associated with the region), then step 740 may be performed.

As shown in FIG. 7, step 740 involves applying classifiers of the next stage to a region of a sub-sampled integral image (e.g. 230, 240, 250, etc.). In one embodiment, the plurality of classifiers applied to the region in step 740 may each be of a different size, shape, type, associated with a different predetermined threshold, some combination thereof, etc. Additionally, respective classification data may be generated for each of the classifiers applied to the region in step 740.

In one embodiment, the number of classifiers applied in a second stage (e.g., following the first stage) may be larger than the number of classifiers applied in the first stage (e.g., in step 710). Additionally, the number of classifiers applied in a third stage (e.g., following the second stage) may be larger than the number of classifiers applied in the second stage (e.g., in step 740).

Step 750 involves determining whether classifiers of the current stage (e.g., applied in step 740) indicate that the region may be associated with a face. If it is determined that the region may not associated with a face (e.g., the classification data for all classifiers applied to the region in step 740 fails to indicate that a face may be associated with the region), then a determination may be made in step 730 that the region is not associated with a face. Alternatively, if it is determined that the region may be associated with a face (e.g., the classification data for at least one of the classifiers applied to the region in step 740 indicates that a face may be associated with the region), then step 760 may be performed.

As shown in FIG. 7, step 760 involves determining whether another stage is to be performed. If it is determined in step 760 that another stage is to be performed, then steps 740-760 may be repeated. Alternatively, if it is determined in step 760 that another stage is not to be performed, then step 770 may be performed.

Step 770 involves determining that the region is associated with a face. Thereafter, in one embodiment, process 700 may terminate.

In one embodiment, process 700 may be repeated for other regions of the same sub-sampled integral image (e.g., 230, 240, 250, etc.). Process 700 may also be repeated for regions of other sub-sampled integral images. Additionally, it should be appreciated that one or more steps of process 700 may be performed in parallel. Further, in one embodiment, one or more steps of process 700 may be performed in parallel with one or more steps of a similar process performed on another region of the same sub-sampled integral image and/or a region of another sub-sampled integral image.

It should be appreciated that process 700 may be performed on a GPU, CPU, or some combination thereof. In one embodiment, one or more steps of process 700 may be performed using a GPU for increased efficiency. For example, one or more steps of process 700 may involve increased localized data processing, and therefore, increases in processing efficiency may be realized by using a GPU which more efficiently processes localized data.

Figure 8:
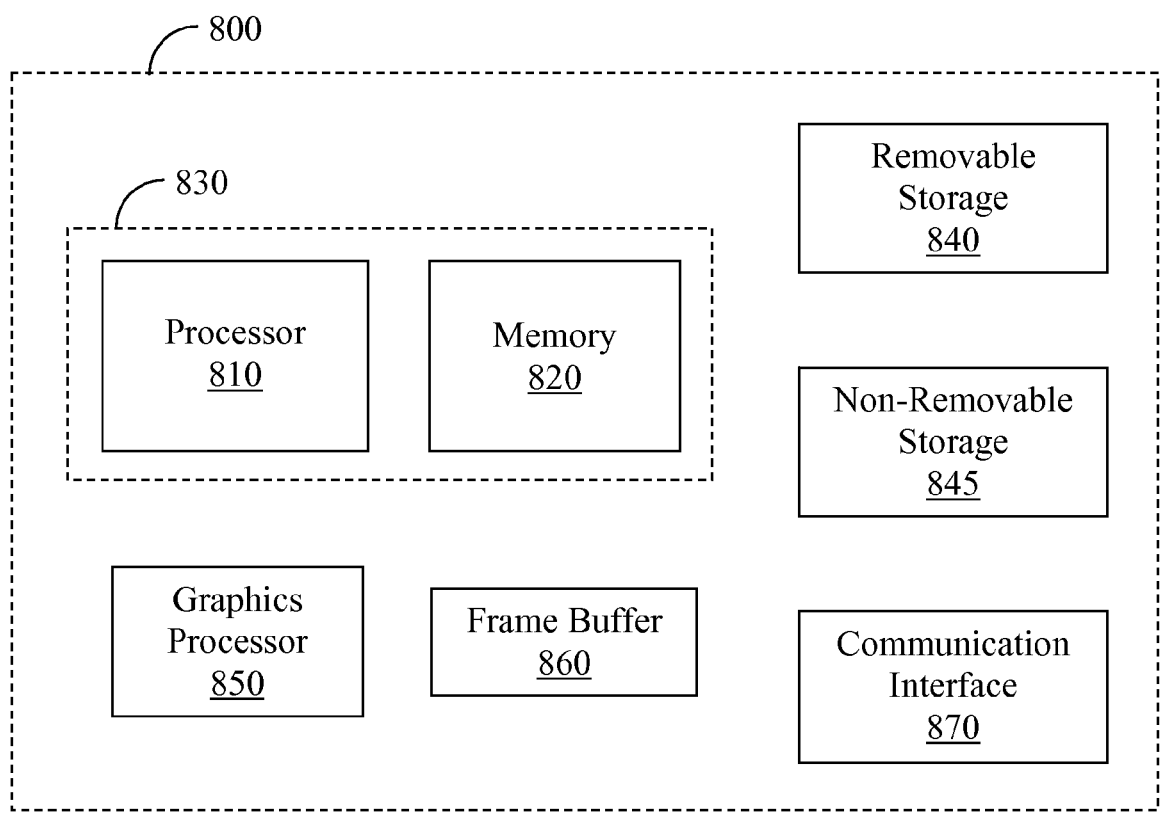
FIG. 8 shows an exemplary computer system platform upon which embodiments of the present invention may be implemented.

FIG. 8 shows exemplary general purpose computer system platform 800 upon which embodiments of the present invention may be implemented. As shown in FIG. 8, portions of the present invention are comprised of computer-readable and computer-executable instructions that reside, for example, in computer system platform 800 and which may be used as a part of a general purpose computer network (not shown). It is appreciated that computer system platform 800 of FIG. 8 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 830, computer system platform 800 may comprise at least one processor 810 and at least one memory 820. Processor 810 may comprise a central processing unit (CPU) or other type of processor. Depending on the configuration and/or type of computer system environment, memory 820 may comprise volatile memory (e.g., RAM), non-volatile memory (e.g., ROM, flash memory, etc.), or some combination of the two. Additionally, memory 820 may be removable, non-removable, etc.

In other embodiments, computer system platform 800 may comprise additional storage (e.g., removable storage 840, non-removable storage 845, etc.). Removable storage 840 and/or non-removable storage 845 may comprise volatile memory, non-volatile memory, or any combination thereof. Additionally, removable storage 840 and/or non-removable storage 845 may comprise CD-ROM, digital versatile disks (DVD) or other optical storage, magnetic cassettes, magnetic tape, magnetic disk storage or other magnetic storage devices, or any other medium which can be used to store information for access by computer system platform 800.

As shown in FIG. 8, computer system platform 800 may communicate with other systems, components, or devices via communication interface 870. Communication interface 870 may embody computer readable instructions, data structures, program modules or other data in a modulated data signal (e.g., a carrier wave) or other transport mechanism. By way of example, and not limitation, communication interface 870 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 870 may also couple computer system platform 800 to one or more input devices (e.g., a keyboard, mouse, pen, voice input device, touch input device, etc.). Additionally, communication interface 870 may couple computer system platform 800 to one or more output devices (e.g., a display, speaker, printer, etc.).

As shown in FIG. 8, graphics processor 850 may perform graphics processing operations on graphical data stored in frame buffer 860 or another memory (e.g., 820, 840, 845, etc.) of computer system platform 800. Graphical data stored in frame buffer 860 may be accessed, processed, and/or modified by components (e.g., graphics processor 850, processor 810, etc.) of computer system platform 800 and/or components of other systems/devices. Additionally, the graphical data may be accessed (e.g., by graphics processor 850) and displayed on an output device coupled to computer system platform 800. Accordingly, memory 820, removable storage 840, non-removable storage 845, frame buffer 860, or a combination thereof, may comprise instructions that when executed on a processor (e.g., 810, 850, etc.) implement a method of detecting a face in an image (e.g., in accordance with process 100 of FIG. 1 and/or process 700 of FIG. 7).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of automatically detecting a face in an image, said method comprising:
   generating an integral image based upon said image;
   sub-sampling said integral image to generate a plurality of sub-sampled integral images, wherein said plurality of sub-sampled integral images comprises a plurality of regions;
   applying a plurality of classifiers to a region of said plurality of regions of said plurality of sub-sampled integral images to generate classification data; and
   determining whether said region is associated with a face based upon said classification data,
   wherein said plurality of sub-sampled integral images comprise different scales of said integral image.

2. The method of claim 1 further comprising:
   applying a plurality of classifiers to a second region of said plurality of regions of said plurality of sub-sampled integral images to generate second classification data;
   determining whether said second region is associated with a face based upon said second classification data; and
   wherein said region and said second region are associated with localized data of said plurality of sub-sampled integral images, and wherein said applying a plurality of classifiers to said region and said applying a plurality of classifiers to said second region involve localized data processing.

3. The method of claim 1 further comprising:
   generating a second image from said image based upon results of determining that said region is associated with said face.

4. The method of claim 3, wherein said second image comprises graphical data for rendering a graphical object around said face, and wherein said graphical object is selected from a group consisting of a box, a circle, a polygon, and a pair of brackets.

5. The method of claim 1, wherein said applying a plurality of classifiers further comprises:
   applying a first plurality of classifiers in a first stage to said region of said plurality of sub-sampled integral images to generate first classification data; and
   if said region is determined to be associated with said face based upon said first classification data, applying a second plurality of classifiers in a second stage to said region of said plurality of sub-sampled integral images to generate second classification data.

6. The method of claim 5, wherein said determining whether said region is associated with a face further comprises determining said region is associated with said face if said region is determined to be associated with said face based upon said second classification data.

7. The method of claim 1, wherein said plurality of classifiers comprises at least two classifiers with a different characteristic, wherein said different characteristic is selected from a group consisting of a size and a shape.

8. The method of claim 1, wherein said determining whether said region is associated with a face further comprises:
   comparing a first portion of said classification data with a predetermined threshold to determine that a region of said image is associated with a portion of said face, wherein said first portion of said classification data is associated with said region of said image.

9. A non-transitory computer-usable medium having computer-readable program code embodied therein for causing a computer system to perform a method of automatically detecting a face in an image, said method comprising:
- generating an integral image based upon said image;
- sub-sampling said integral image to generate a plurality of sub-sampled integral images, wherein said plurality of sub-sampled integral images comprises a plurality of regions;
- applying a plurality of classifiers to a region of said plurality of regions of said plurality of sub-sampled integral images to generate classification data; and
- determining whether said region is associated with a face based upon said classification data.

10. The non-transitory computer-usable medium of claim 9, wherein said method further comprises:
- generating a second image from said image based upon results of determining that said region is associated with said face.

11. The non-transitory computer-usable medium of claim 10, wherein said second image comprises graphical data for rendering a graphical object around said face, and wherein said graphical object is selected from a group consisting of a box, a circle, a polygon, and a pair of brackets.

12. The non-transitory computer-usable medium of claim 9, wherein said applying a plurality of classifiers further comprises:
- applying a first plurality of classifiers in a first stage to said region of said plurality of sub-sampled integral images to generate first classification data; and
- if said region is determined to be associated with said face based upon said first classification data, applying a second plurality of classifiers in a second stage to said region of said plurality of sub-sampled integral images to generate second classification data.

13. The non-transitory computer-usable medium of claim 12, wherein said determining whether said region is associated with a face further comprises determining said region is associated with said face if said region is determined to be associated with said face based upon said second classification data.

14. The non-transitory computer-usable medium of claim 9, wherein said plurality of classifiers comprises at least two classifiers with a different characteristic, wherein said different characteristic is selected from a group consisting of a size and a shape.

15. The non-transitory computer-usable medium of claim 9, wherein said determining whether said region is associated with a face further comprises:
- comparing a first portion of said classification data with a predetermined threshold to determine that a region of said image is associated with a portion of said face, wherein said first portion of said classification data is associated with said region of said image.

16. A computer system comprising a processor and a memory, wherein said memory comprises instructions that when executed by said processor perform a method of detecting a face in an image, said method comprising:
- generating an integral image based upon said image;
- sub-sampling said integral image to generate a plurality of sub-sampled integral images, wherein said plurality of sub-sampled integral images comprises a plurality of regions;
- applying a plurality of classifiers to a region of said plurality of regions of said plurality of sub-sampled integral images to generate classification data; and
- determining whether said region is associated with a face based upon said classification data.

17. The computer system of claim 16, wherein said method further comprises:
- generating a second image from said image based upon results of determining that said region is associated with said face.

18. The computer system of claim 17, wherein said second image comprises graphical data for rendering a graphical object around said face, and wherein said graphical object is selected from a group consisting of a box, a circle, a polygon, and a pair of brackets.

19. The computer system of claim 16, wherein said applying a plurality of classifiers further comprises:
- applying a first plurality of classifiers in a first stage to said region of said plurality of sub-sampled integral images to generate first classification data; and
- if said region is determined to be associated with said face based upon said first classification data, applying a second plurality of classifiers in a second stage to said region of said plurality of sub-sampled integral images to generate second classification data.

20. The computer system of claim 19, wherein said determining whether said region is associated with a face further comprises determining said region is associated with said face if said region is determined to be associated with said face based upon said second classification data.

21. The computer-usable medium of claim 16, wherein said plurality of classifiers comprises at least two classifiers with a different characteristic, wherein said different characteristic is selected from a group consisting of a size and a shape.

22. The computer system of claim 16, wherein said determining whether said region is associated with a face further comprises:
- comparing a first portion of said classification data with a predetermined threshold to determine that a region of said image is associated with a portion of said face, wherein said first portion of said classification data is associated with said region of said image.

23. The computer system of claim 16, wherein said processor comprises a graphics processing unit.

* * * * *